Inventors
JAMES ALEXANDER PETRIE
KENNETH EDWARD GEORGE BRACEY
By
Cushman, Darby & Cushman
Attorney

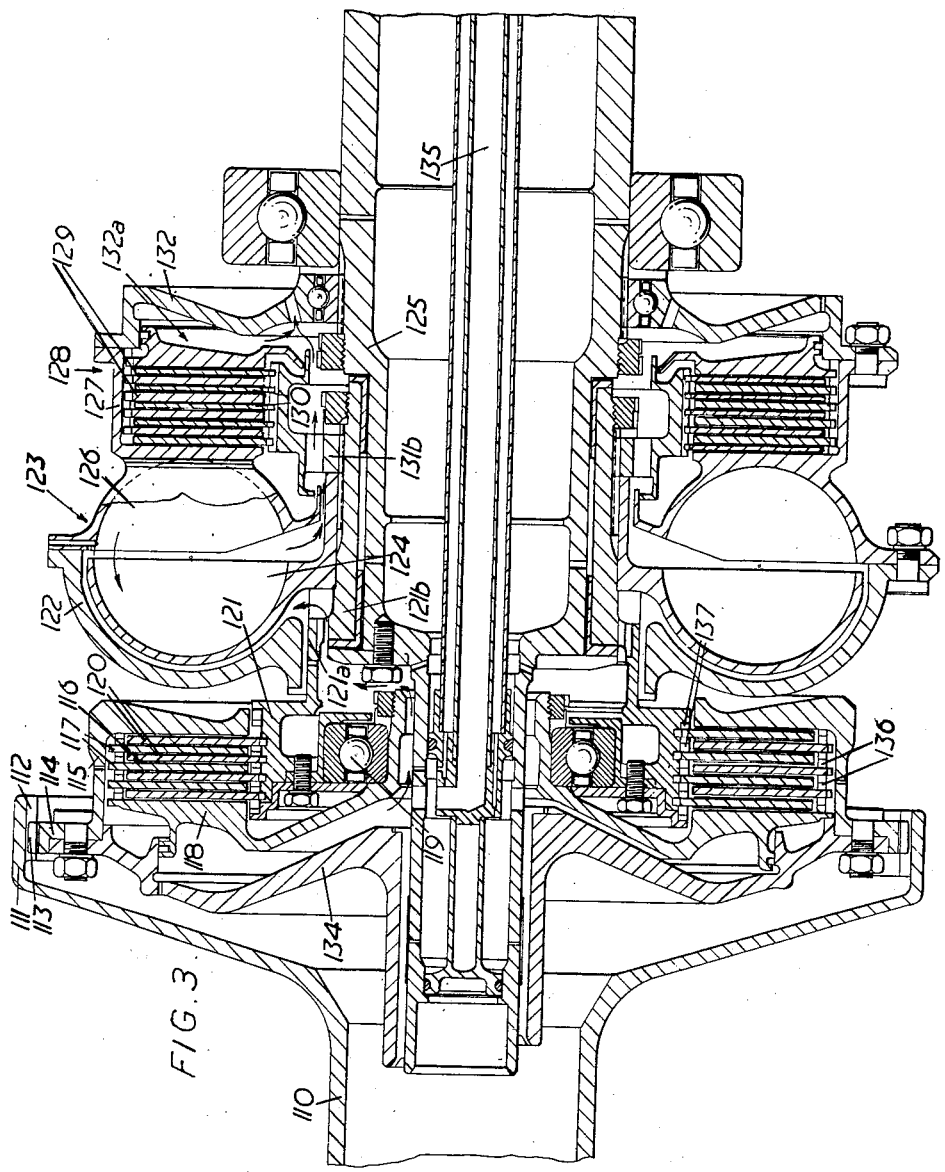

United States Patent Office 3,088,563
Patented May 7, 1963

3,088,563
FLUID COUPLING AND FRICTION CLUTCHES
James Alexander Petrie, Littleover, Derby, and Kenneth Edward George Bracey, Findern, England, assignors to Rolls-Royce Limited, Derby, England, a British company
Filed June 22, 1960, Ser. No. 37,889
Claims priority, application Great Britain June 25, 1959
8 Claims. (Cl. 192—3.2)

This invention relates to an improved friction clutch including a fluid coupling.

One use of the clutch, to which the invention is in no way limited, is to connect an output shaft driven by a gas turbine engine to an input shaft of an auxiliary compressor.

The gas turbine engine may be provided on a rotary wing aircraft having a propeller driven by a low pressure turbine of the engine, the output shaft from said engine also being driven by said low pressure turbine and compressed air from the auxiliary compressor being used in the production of a motive fluid employed for driving a rotor of said aircraft.

One object of the present invention is to ensure that the fluid coupling is isolated from the engine output shaft when the auxiliary compressor is not required to be driven and another object of the invention is to prevent the loss of power associated with a fluid coupling when driving at high rotational speed.

A further object of the present invention is to reduce the relative speeds of certain adjacent clutch plates during engagement, thereby reducing the friction encountered during initial engagement and thus reducing wear and preventing over heating due to friction.

According to the present invention a device for effecting a drive between a driving member and a driven member comprises a first plate type clutch, a hydraulic vane type coupling and a second plate type clutch, said coupling being positioned between the first and second clutches, one part of said coupling being permanently connected to the driven member, and said coupling being connected to each clutch in a manner such that the first clutch, when engaged, connects one half of the coupling with the driving member and the second clutch when engaged, connects the driven member with the first clutch thereby locking the two parts of the hydraulic coupling together.

Preferably the coupling has two sets of vanes, the said first plate type clutch having a plurality of driving clutch plates carried by a member driven by the driving member and a plurality of driven clutch plates carried by a member carrying one set of the vanes of the hydraulic coupling, the second plate type clutch having a plurality of driving clutch plates carried by a member driven by the other set of vanes of the hydraulic coupling and a plurality of driven clutch plates carried by a member connected to the said driven member, a hydraulic fluid supply system arranged to urge the clutch plates of the first plate type clutch into driving engagement with each other so as to effect a drive between the driving member and part of the hydraulic coupling, the said hydraulic coupling then being filled with said hydraulic fluid so as to effect a drive between the two sets of vanes thereby effecting a drive between the said first plate type clutch and the driven member, hydraulic fluid also being fed to the second plate type clutch to urge the clutch plates into driving engagement with each other in order to transmit a positive drive between the first plate type clutch and the driven member.

In a preferred arrangement the action of centrifugal force upon the fluid supply to the first and second clutches increases the pressure of the fluid sufficiently to cause the clutch plates to be urged together into driving engagement.

Preferably the driven clutch plate members of the said first plate type clutch are carried by a member which surrounds the driven member and supports one set of vanes of the hydraulic coupling together with the driving clutch plates of the said second clutch.

In one arrangement of the invention the member carrying the set of vanes of the hydraulic coupling and the driving clutch plates of the second clutch forms the outer casing of both the hydraulic coupling and the said second clutch.

In another arrangement of the invention the member carrying the set of vanes of the hydraulic coupling and the driving clutch plates of the second clutch is in the form of a shaft closely surrounding the driven member, the outer casing of the second clutch being drivingly connected to the driven member and to the outer casing of the hydraulic coupling.

The driving and driven clutch plates of the first and second clutches are urged apart, when no drive is being effected, by means of spring rings.

Two embodiments of the invention will now be described with reference to the accompanying drawings in which:

FIGURE 3 is an axial section through a further embodiment of a clutch device according to the present invention.

Figure 1:
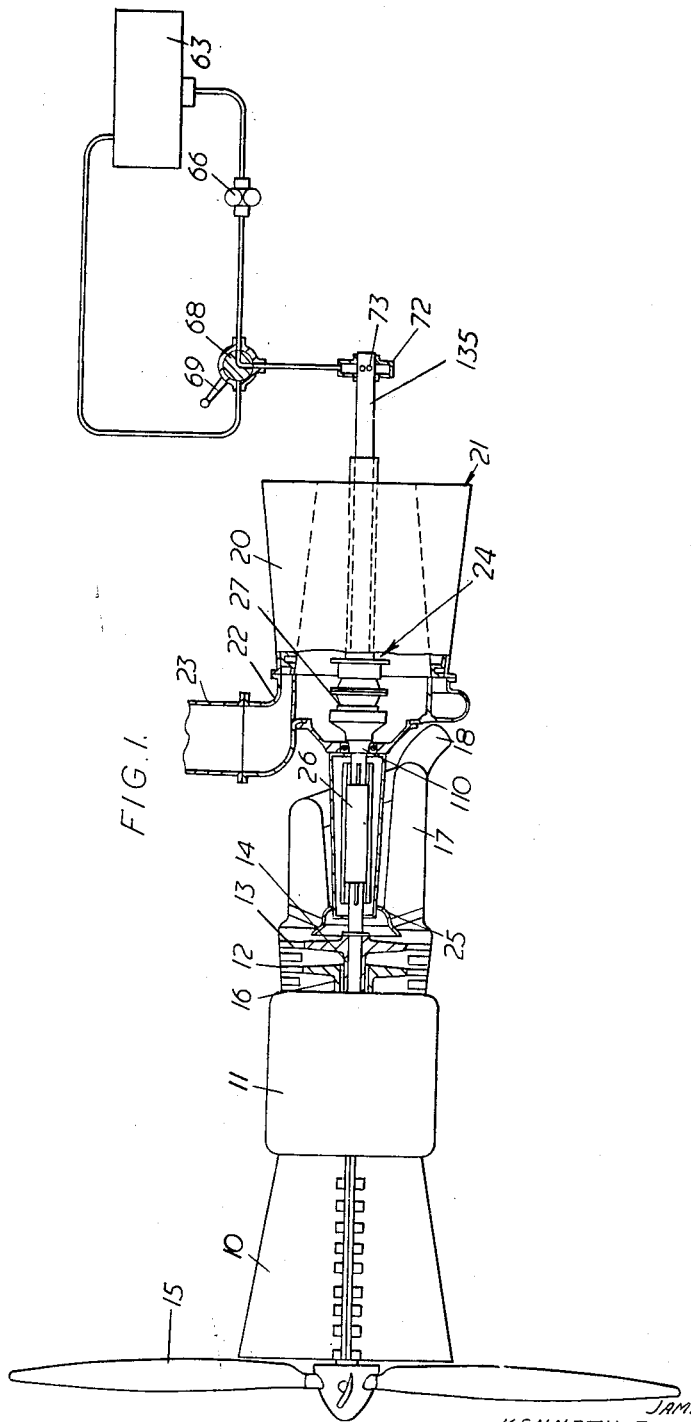
FIGURE 1 is a schematic view, partly in section, of a turbo-propeller engine arranged to drive an auxiliary compressor through a clutch device according to the present invention.

Referring to the drawings, a rotary wing aircraft comprises a centrally disposed aircraft rotor (not shown) for effecting vertical ascent and descent of the aircraft and two turbo-propeller engines, arranged on opposite sides of the aircraft fuselage for effecting forward thrust. One of these turbo-propeller engines is illustrated in FIGURE 1.

As seen in FIGURE 1 each turbo-propeller engine comprises high and low pressure compressors 10, combustion equipment 11 and high and low pressure turbines 12, 13 respectively. The low pressure compressor and the low pressure turbine 13 are mounted on a shaft 14 which drives a propeller 15 through reduction gearing (not shown), the shaft 14 being mounted concentrically within a shaft 16 on which are mounted the high pressure compressor and the high pressure turbine 12. The exhaust gases from the turbine 12, 13 pass into a jet pipe 17 having an exhaust nozzle 18.

Each turbo propeller engine includes an auxiliary axial flow compressor 20 having an air intake 21, the air compressed by the auxiliary compressor 20 passing into a volute 22 and then into a duct 23. The compressed air from the ducts 23 and the two auxiliary compressors 20 passes to the main rotor of the aircraft where it is employed in the production of the motive fluid used to drive the rotor.

Each auxiliary compressor 20 includes a rotor shaft generally designated 24 which is driven from the shaft 14 by way of a shaft 26 which is mounted within a casing 25 through a coupling device 27.

One end of the shaft 26 has the splined connection with the shaft 14 and the other end of the shaft 26 is connected to a driving input shaft 110 of a coupling device 27.

Figure 2:
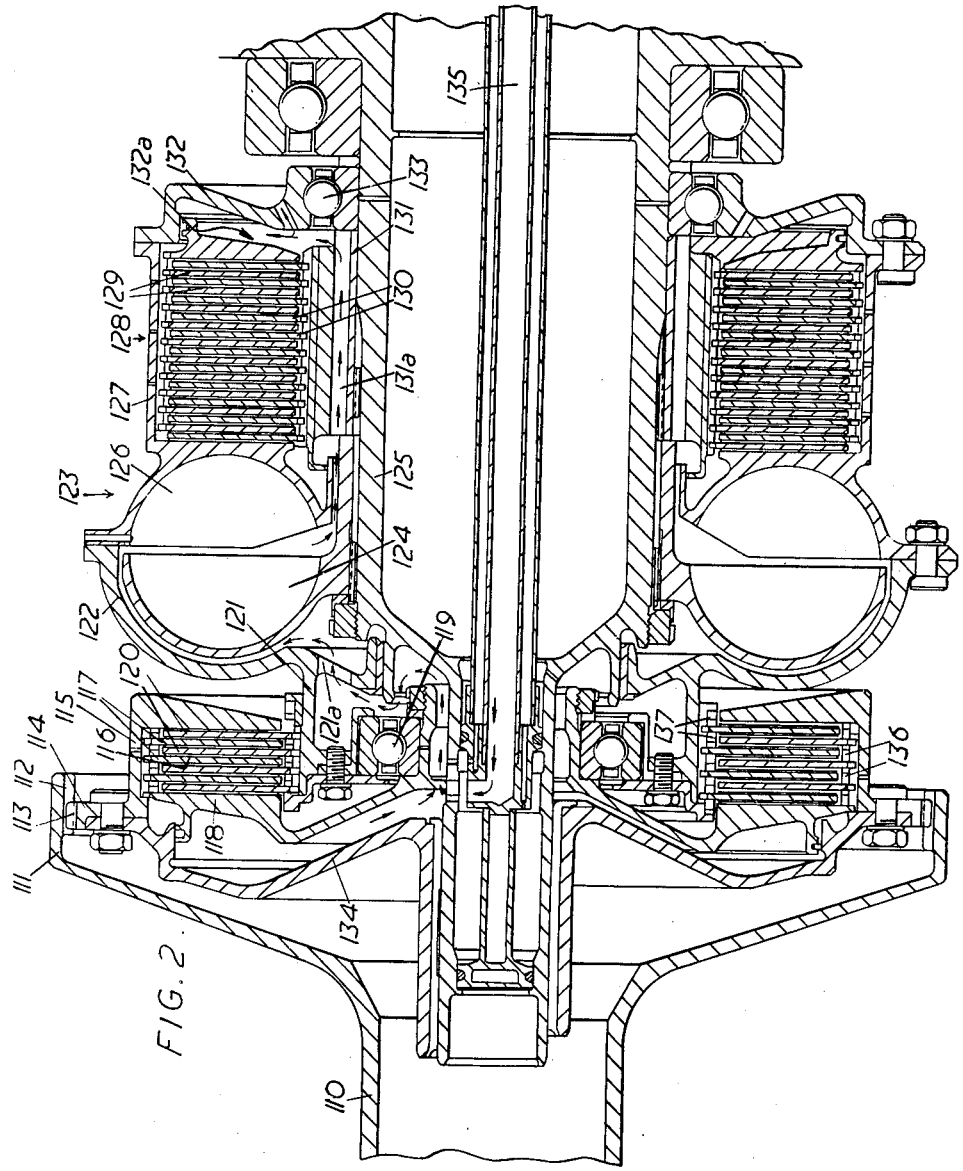
FIGURE 2 is an axial section through a clutch device according to one embodiment of the invention.

One embodiment of the coupling device 27 is shown in FIGURE 2. The driving input shaft 110 has, at its end remote from the low pressure turbine 13, an enlarged diameter portion 111 having internal splines 112.

The splines 112 engage with a series of splines 113 formed on the outer periphery of a radially extending flange 114 which forms part of the outer casing 115 of a plate type clutch 116.

The clutch 116 also comprises a number of driving clutch plates 117 which are mounted for axial movement in the outer casing 115, a thrust plate 118 which is supported from a thrust bearing 119 and a series of driven clutch plates 120 which alternate with the plates 117 and are mounted for axial movement on an inner shaft 121.

The inner shaft 121 forms an axial extension of the outer casing 122 of a fluid coupling 123. Mounted within the casing 122 is a vaned member 124 which is secured to a driven shaft 125 which forms part of the rotor shaft 24 of the auxiliary compressor 20 and thus may be considered the input drive to the auxiliary compressor 20. The fluid coupling 123 is also formed with a second vaned portion 126 which is mounted on the outer casing 122 and this portion is provided with an axially-directed annular wall which forms the outer casing 127 of a second plate type clutch 128.

The clutch 128 is provided with a number of driving clutch plates 129 which are mounted with freedom for axial movement within the outer casing 127. Alternating with the driving clutch plates 129 are a set of driven clutch plates 130 which are carried on the outer periphery of a sleeve 131 which is secured to the driven shaft 125. The outer casing 127 of the clutch 128 also has an end wall 132 mounted on a thrust bearing 133.

The outer casing 115 of the clutch 116 is connected to an operating piston 134 which is spaced axially from the thrust plate 118.

An oil supply pipe 135 is mounted within the driven shaft 125 and during operation of the coupling device 123 this pipe is supplied with hydraulic fluid from muff 72 shown in FIGURE 1. The chamber formed by the muff 72 communicates with the interior of the oil supply pipe 135 through drillings 73 formed in the pipe. Hydraulic fluid is drawn from a supply tank 63 and pressurised by a pump 66 which delivers pressurised hydraulic fluid to the muff 72 via a two position control valve 68.

The valve 68 is operated by a lever 69 and is moveable from a first position in which high pressure fluid is directed to flow into the supply pipe 135, to a second position in which the interior of the muff 72 is connected to a region of low pressure.

In order to effect a drive between the driving input shaft 110 and the auxiliary compressor driven shaft 125, oil from the supply pipe 135 is fed to the space formed between the operating piston 134 and the thrust plate 118. As these parts are being driven by the driving shaft 110, the effect of centrifugal force on the oil will increase the pressure of the oil causing an axial load to be applied to the operating piston 134 which will force the driving clutch plates 117 into driving engagement with the driven clutch plates 120.

Therefore, a positive drive will be transmitted from the driving shaft 110 through the clutch 116 to the inner shaft 121 and the outer casing 122 of the fluid coupling 123. When the oil has filled the chambers between the pistons 134 and 118 it is then fed by overflow through apertures 121a into the interior of the fluid coupling 123. When the vaned portions 124 and 126 of the fluid coupling 123 are filled with oil, a drive will be transmitted from the vaned portion 126 to the vaned portion 124.

As the vaned portion 124 is connected to the shaft 125 a drive will be transmitted to the compressor causing it to rotate.

Oil from the fluid coupling 123 is allowed to flow through a drilling 131a formed in the sleeve 131 to an annular space 132a formed between the end wall 132 and the clutch plates of the clutch 128. As the outer casing 127 and the end wall 132 are rotated by the fluid coupling 123 the oil fed to the space 132a will increase in pressure due to the effect of centrifugal force and therefore an axial load will be applied to the clutch plates 129 and 130 causing them to be brought into driving engagement. The drive to the shaft 125 will then be taken through the clutch 116, the outer casing 122 of the coupling 123 and the clutch 128 so by-passing the fluid coupling 123.

It will be appreciated that the clutch 116 when disengaged uncouples the fluid coupling 123 and the auxiliary compressor 20 from the turbo-propeller engine. The clutch 128 locks the two parts of the fluid coupling together to avoid loss in power due to slip between the vaned portions 124 and 126 once the auxiliary compressor 20 has been accelerated up to near full rotational speed.

The clutch 116 also has the duty of accelerating the low inertia of the vaned portion 126 when the coupling 123 is empty and one set of clutch plates of the friction clutch 128. As a result of this the rubbing speed of the clutch plates 129 and 130 are considerably reduced.

Instead of operating the clutches 116, 128 and the fluid coupling 123 by allowing a flow of pressurised oil to pass from one clutch member to another each of the clutches 116, 128 and the fluid coupling 123 may be provided with its own separate oil feed and the three oil feed may be controlled by a sequenced valve arrangement.

In order to separate the clutch plates 117 and 120 of the clutch 116 when disengaged slotted spring rings 136 are provided adjacent the outer periphery of the clutch plates 117, and spring rings 137 are provided adjacent the inner periphery of the clutch plates 120. It is necessary to separate the plates 117 and 120 during disengagement as this clutch will be running uncoupled for long periods.

In FIGURE 3 the inner shaft 121 of the clutch 116 is provided with an axial extension 121b which passes through the outer casing 122 of the fluid coupling 123 and surrounds the compressor driven shaft 125. The axial extension 121b has secured to it the vaned member 124 and a sleeve 131b which carries on its outer periphery the clutch plates 130 of the clutch 128 .

The end wall 132 of the outer casing 127 is splined to the compressor input shaft 125.

To effect a drive between the driving input shaft 110 and the compressor driven shaft 125 oil from the supply pipe 135 is fed to the clutch 116 in order to engage it and therefore a positive drive is transmitted from the shaft 110 through the clutch 116 to the inner shaft axial extension 121b thereby causing rotation of the vaned member 124 and the sleeve 131b. After the fluid coupling has been filled with oil a drive is transmitted from the vaned member 124 to the vaned portion 126 and as the portion 126 is connected to the outer casing 127 of the clutch 128 the drive will be taken to the end wall 132 causing the driven shaft 125 to rotate. When the clutch 128 becomes engaged the drive will by-pass the fluid coupling 123.

By arranging for the shaft 121 to rotate the vaned member 124 and the sleeve 131b instead of the outer casings 122 and 127 there is a reduction in the mass the clutch 116 has to accelerate.

The remaining details of FIGURE 3 are the same as those described with reference to FIGURE 2.

What we claim is:

1. A device for effecting a drive between a driving member and a driven member comprising: a first plate-type clutch having a driving part and a driven part, means connecting the driving member to the first clutch driving part, a hydraulic vane-type coupling, and a second plate-type clutch having a driving part and a driven part, said coupling being positioned between the first and second clutches and having a first part permanently connected to the driven member and a second part permanently connected to the driven part of said first clutch and the driving part of said second clutch, said driven part of said second clutch being connected to said driven member, and automatic means sequentially engaging said first clutch and operating said coupling and then engaging said second clutch whereby the driving and driven parts of said second clutch are moving at differential speeds in the same direction prior to engagement and, when engaged, lock the first and second parts of said fluid coupling together.

2. In a device of the class described: a driving member; a driven member; means for effecting a drive between said driving and driven members and including a first plate-type clutch having at least one driving clutch plate and at least one driven clutch plate, a hydraulic vane-type coupling having a driving vane member and a driven vane member, and a second plate-type clutch having at least one driving clutch plate and at least one driven clutch plate; said driving clutch plate of said first clutch being operatively connected to said driving member, said driving vane member of said vane-type coupling being operatively connected to said driven clutch plate of said first clutch and to said driving clutch plate of said second clutch, said driven vane member of said vane-type coupling being operatively connected to said driven member and to the driven clutch plate of said second clutch; and hydraulic means for sequentially operating said first clutch, said hydraulic vane-type coupling, and said second clutch whereby said second clutch is operated to effect a positive drive between said first clutch and said driven member after said driven member is initially started by operating said fluid coupling.

3. The device of claim 2 including a member surrounding said driven member and rotatable with respect thereto, said member supporting said driven clutch plate of said first clutch and said driving vane member of said hydraulic vane-type coupling and the driving clutch plate of said second clutch.

4. The device of claim 3 in which said member carrying the driving vane member and the driving clutch plate of said second clutch is an outer rotatable casing of said hydraulic vane-type coupling and said second clutch.

5. The device of claim 3 in which said member carrying the driving vane member and the driving clutch plate of said second clutch is a tubular shaft closely surrounding said driven member, said second clutch having an outer casing drivingly connected to said driven member and supporting the driven clutch plate of said second clutch, said hydraulic vane-type coupling having an outer casing supporting said driven vane member and operatively connected to the outer casing of said second clutch.

6. In a device of the class described: a driving member; a driven member; means for effecting a drive between said driving and driven members, said last-mentioned means including a first plate-type clutch comprising an outer casing operatively connected to said driving member, a plurality of driving clutch plates carried by said outer casing, a plurality of driven clutch plates and a hydraulically actuated piston means rotatable with said outer casing for engaging said driving and driven clutch plates; a generally tubular member surrounding said driven member and rotatable with respect thereto, said tubular member carrying said driven clutch plates of said first clutch; a hydraulic vane-type coupling having a driving vane carried by said tubular member and a driven vane member operatively connected to said driven member; a second plate-type clutch having a plurality of driving clutch plates carried by said tubular member and a plurality of driven clutch plates operatively carried by said driven member, and a hydraulically actuated piston means for engaging the driving and driven clutch plates; and means sequentially supplying hydraulic fluid first to the piston means of said first clutch to cause actuation of the same and rotation of said tubular member and the driving vane of said coupling and the driving clutch plates of said second clutch carried thereby, then to said coupling to cause said driven vane member to be actuated, thereby rotating said driven member and the driven clutch plates of said second clutch and then to the piston means of said second clutch to actuate said second clutch to lock said driving and driven vane members of said coupling together.

7. The device of claim 6 including spring means interposed between the driving and driven clutch plates of said first and second clutches, respectively, for normally urging the driving and driven clutch plates apart when said hydraulic fluid supply means is inoperative.

8. The device of claim 6 wherein said hydraulic fluid supply means includes a supply tube concentrically mounted within said driven member and having an outlet leading to said piston means of said first clutch, a passageway to said hydraulic vane-type coupling, and a second pasageway from said hydraulic vane-type coupling to said piston means of said second clutch.

References Cited in the file of this patent
UNITED STATES PATENTS 2,670,823    Thurber _____ Mar. 2, 1954